United States Patent [19]

Wolf

[11] Patent Number: 5,773,550
[45] Date of Patent: Jun. 30, 1998

[54] POLYADDITION PRODUCT CONTAINING ISOCYANURATE GROUPS AND URETDIONE GROUPS, AND A PROCESS FOR PREPARING SAME

[75] Inventor: Elmar Wolf, Recklinghausen, Germany

[73] Assignee: Huels Aktiengesellschaft, Marl, Germany

[21] Appl. No.: 799,878

[22] Filed: Feb. 14, 1997

[30] Foreign Application Priority Data

Feb. 19, 1996 [DE] Germany .................... 196 06 030.3

[51] Int. Cl.$^6$ .................................................. C08G 18/12
[52] U.S. Cl. ................................ 528/59; 528/45; 528/49; 528/70; 540/202
[58] Field of Search .................... 528/59, 45, 49, 528/70; 540/202

[56] References Cited

U.S. PATENT DOCUMENTS

| | | | |
|---|---|---|---|
| 3,998,794 | 12/1976 | Mueller et al. | 528/59 |
| 4,476,054 | 10/1984 | Disteldorf et al. | 544/222 |
| 4,483,798 | 11/1984 | Disteldorf et al. | 528/59 |
| 4,912,210 | 3/1990 | Disteldorf et al. | 540/202 |

FOREIGN PATENT DOCUMENTS

| 0 045 998 | 2/1982 | European Pat. Off. . |
|---|---|---|
| 0 478 990 | 4/1992 | European Pat. Off. . |

*Primary Examiner*—Yogendra N. Gupta
*Attorney, Agent, or Firm*—Oblon, Spivak, McClelland, Maier & Neustadt, P.C.

[57] ABSTRACT

Isocyanurate- and uretdione-group-containing polyaddition product of an isophorone diisocyanate comprising the reaction product of:

i) an isophorone diisocyanate which contains isocyanurate groups and uretdione groups; and
ii) a diol component selected from the group consisting of a diol, a disecondary diamine, a linear hydroxyl-containing polyester and a mixture thereof, wherein said isophorone diisocyanate comprises not more than 2% by weight of free isophorone diisocyanate and $\geq 5$ wt. % of isophorone diisocyanate isocyanurate, wherein said isophorone diisocyanate is reacted with said diol component in an NCO/OH ratio of 1:0.5–1:0.95 and/or an NCO/NH ratio of 0.5:1 0.95:1.

22 Claims, No Drawings

POLYADDITION PRODUCT CONTAINING ISOCYANURATE GROUPS AND URETDIONE GROUPS, AND A PROCESS FOR PREPARING SAME

BACKGROUND OF THE INVENTION

1. Field of the Invention

The present invention relates to a novel isocyanurate and uretdione-group-containing polyaddition product and a process for preparing same.

2. Discussion of the Background

DE-C 30 30 572 (U.S. Pat. No. 4,483,798) describes polyaddition products which contain uretdione groups and have in the meantime acquired economic importance for the preparation of PU powders free from blocking agents. These compounds claimed in DE-C 30 30 572 are polyaddition compounds of an isophorone diisocyanate (IPDI) which contains uretdione groups but no isocyanurate groups (referred to in the following text as isophorone diisocyanate uretdione and in abbreviated form as IPDI uretdione) and diols, the resulting addition product being reacted, if desired and wholly or partially, with monoalcohols and/or monoamines.

A prerequisite for the preparation of the uretdione-group-containing polyaddition products from IPDI uretdione and diols is, as stated in DE-A 30 30 572, p. 1, lines 20–35, a substantially isocyanurate-free IPDI uretdione, which is described in DE-C 30 30 513 (U.S. Pat. No. 4,476,054) and DE-A 37 39 549 (U.S. Pat. No. 4,912,210). DE-C 30 30 513 describes the dimerization of IPDI with tris(dialkylamino) phosphines, in DE-A 37 39 549 with 4-dialkylamino-substituted pyridine.

These uretdione-group-containing polyaddition products, which are prepared on the industrial scale, have a series of disadvantages which lie in the quality of the IPDI uretdione employed. For example, long reaction times are necessary for the dimerization of IPDI with substituted pyridines. Moreover, the IPDI uretdiones prepared in this way possess, as described in EP 0 478 990, a strong inherent color. It is also necessary to deactivate the pyridine residues present in the IPDI uretdione.

It would be highly advantageous and desirable, in preparing a uretdione-group-containing polyaddition product, to be able to employ an IPDI uretdione which was not hampered by the above-mentioned disadvantages of the IPDI uretdione which is currently employed.

It has surprisingly been found that it is possible to employ a IPDI uretdione further comprising isocyanurate groups (trimer of IPDI (isophorone diisocyanate isocyanurate)), such as that prepared in accordance with the teaching of DE-A 19 34 763 for the preparation of the uretdione-group-containing polyaddition products. This was all the more surprising since it is expressly stated in DE-C 30 30 572 that an IPDI uretdione prepared according to DE-A 19 34 763, which still contains 20–40% by weight of the trimeric IPDI (IPDI isocyanurate) in the mixture, is unsuitable for specific subsequent reaction with, for example, diols.

SUMMARY OF THE INVENTION

The invention provides isocyanurate- and uretdione-group-containing polyaddition product comprising the reaction product of:

i) an isophorone diisocyanate which contains isocyanurate groups and uretdione groups; and ii) a diol component selected from the group consisting of a, a disecondary diamine, a linear hydroxyl-containing polyester and a mixture thereof, wherein said isophorone diisocyanate comprises not more than 2% by weight of free isophorone diisocyanate and $\geq 5$ wt. % of isophorone diisocyanate isocyanurate, wherein said isophorone diisocyanate is reacted with said diol component in an NCO/OH ratio of 1:0.5–1:0.95 and/or an NCO/NH ratio of 0.5:1 0.95:1.

DETAILED DESCRIPTION OF THE PREFERRED EMBODIMENTS

The isocyanurate- and uretdione-group-containing isophorone diisocyanate employed in accordance with the invention, which will be referred to below in abbreviated form as IPDI-UD/T, preferably contains <2 wt. % of free IPDI, more preferably $\leq 1$ wt. % of free IPDI, even more preferably $\leq 0.5$ wt. %.

The IPDI-UD/T preferably contains $\geq 5$ wt. % of IPDI isocyanurate, more preferably $\geq 10$ wt. %, even more preferably $\geq 15$ wt. %, even more preferably $\geq 20$ wt. % and preferably $\leq 40$ wt. % of IPDI isocyanurate.

The IPDI-UD/T preferably contains $\leq 95$ wt. % of IPDI uretdione, more preferably $\leq 90$ wt. %, even more preferably $\leq 85$ wt. %, even more preferably $\leq 80$ wt. % and preferably $\geq 60$ wt. % IPDI uretdione.

IPDI-UD/T, may be prepared by reacting IPDI using the catalysts described in DE-A 19 34 763. In this reaction, IPDI is reacted with 1–2% by weight of tributylphosphine at room temperature for 10–40 h. The longer the reaction of the IPDI, the higher the content of isocyanurate groups in the reaction mixture. The unreacted free IPDI is separated off from the reaction product by thin-film distillation at 100°–140° C./0.1 mbar. The IPDI-freed reaction product contains $\leq 1\%$ of free IPDI and has an NCO content of 17–18%; the content of IPDI isocyanurate may vary depending on the IPDI conversion, from 20 to a maximum of 30% by weight.

In the reaction of IPDI-UD/T with the diol component it is possible in this case to use a procedure in which the diol component is introduced in one go or else is added to the IPDI-UD/T by gradual introduction.

Preferably, the reactants are mixed in the stated ratios. Then the IPDI-UD/T is introduced and the diol component is added. The reaction is carried out in the presence of solvents inert toward isocyanates at from 20° to 90° C. Non-limiting examples of suitable solvents are aromatic hydrocarbons, such as toluene or xylene, chlorobenzene, nitrobenzene and ketones, such as acetone, methyl isobutyl ketone, cyclopentanone and cyclohexanone, or esters such as ethyl acetate and butyl acetate.

Non-limiting examples of such diol components are diols such as ethylene glycol, 1,2- and 1,3-propylene glycol, 2-ethylhexane-1,3-diol, hexanediol, octanediol, decanediol, dodecanediol, neopentyl glycol, 1,4-bishydroxymethylcyclohexane, 3(4),8(9)-bishydroxymethyltricyclodecane, 2-methylpropane-1,3-diol, 3-methylpentane-1,5-diol, diethylene glycol and neopentyl glycol hydroxypivalate, 1,4-butanediol, as a linking diol, is preferably employed for synthesizing the isocyanurate-group-containing polyuretdione-polyurethanes according to the invention.

As diol components it is also possible, advantageously, to employ linear hydroxyl-containing polyesters with a molar mass of between 250 and 2,000, preferably 300–1,500, as chain extenders for IPDI-UD/T. They may be prepared by, for example, combining diols and dicarboxylic acids. In addition to the above-mentioned diols trans- and cis-cyclohexanedimethanol (CHDM) are preferably employed for preparing the chain extenders. The preferred dicarboxylic acids include aliphatic, optionally alkyl-branched acids, such as succinic, adipic, suberic, azelaic and sebacic acid and 2,2,4(2,4,4)-trimethyladipic acid; also included herein are lactones and hydroxycarboxylic acids, such as ε-caprolactone and hydroxycaproic acid. The diol/chain extender mixtures employed in the novel process are in a ratio of from 5:95.

The reaction generally takes place at temperatures of 60°–90° C. The reaction components are heated at the temperatures indicated until all OH groups have reacted to form urethane groups. Depending on the reaction temperature, this takes 0.5–5 h. In order to accelerate the reaction it is also possible to employ catalysts, such as tin(II) acetate, tin(II) octoate, tin(II) laurate, dibutyltin diacetate, dibutyltin dilaurate, dibutyltin maleate or dioctyltin diacetate.

The reaction mixtures are generally worked up by freeing the isocyanurate-group-containing polyuretdione-polyurethanes from any solvent used. Suitable apparatus for this are evaporating screws, filmtruders or else spray driers.

A particularly advantageous variant of the invention consists in reacting the described reaction products (having free NCO groups) with monoalcohols in such a way that all or at least some of the NCO groups are reacted. The procedure comprises reacting the IPDI-UD/T with the component ii) (i.e. diol, disecondary diamine, or the linear hydroxyl-containing polyester) under the conditions already described and, after the reaction, not cooling the reaction product but adding the monoalcohol while retaining the temperature. The reaction mixture is then heated further until the equivalent amount of NCO per equivalent of OH employed has been reacted. The reaction products are isolated in a manner similar to that described above. Suitable monohydric alcohols are methanol, ethanol, n-butanol, 2-ethylhexanol and n-decanol. In place of the monoalcohols it is also possible to employ primary or secondary monoamines. Examples of suitable monoamines are n-propylamine, n-butylamine, n-hexylamine and dibutylamine.

A particularly advantageous variant of the invention consists in reacting IPDI-UD/T with the diol component and/or the OH-containing linear polyesters (OH-containing chain extenders) such that the reaction products contain terminal OH groups, i.e. such that the IPDI-UD/T is reacted with the diol component and/or chain extender in an NCO/OH ratio of 0.5:1–0.95:1. These polyaddition compounds of IPDI-UD/T and diols and/or chain extenders have the feature, relative to their counterparts containing NCO groups and/or urethane or urea groups, of being of heightened reactivity (under hot conditions) with respect to OH-containing reactants.

If, in accordance with the invention, disecondary diamines are employed as component ii) instead of diols or OH-containing chain extenders, it has been found particularly advantageous to operate at room temperature in solution. The disecondary diamine is added a little at a time in the proportion indicated to the dissolved IPDI-UD/T at a rate such that the temperature of the reaction mixture does not exceed 40° C. After the diamine has been added the reaction is at an end and, if the reaction products contain free NCO groups or secondary amino groups, the solvent—generally acetone—is removed as above for the corresponding IPDI-UD/T-diol adducts. If the free NCO groups of the reaction products are to be reacted wholly or partially with monoalcohols, the monoalcohol is added to the reaction mixture after the diamine has been added and the mixture is heated at 60° C. until 1 NCO equivalent has reacted per equivalent of OH employed. The solvent is then removed as already described a number of times.

The diamines to be employed in accordance with the invention may be disecondary diamines which are prepared in two stages, the 1st stage comprising condensation of a (cyclo)aliphatic diamine having two primary amino groups with an aldehyde or ketone to form the Schiff base, and the 2nd stage comprising hydrogenation of the Schiff base. For the condensation reaction to form the Schiff base, suitable diamines are in principle all (cyclo)aliphatic diamines, examples being ethylenediamine, 1,2-diaminopropane, 2-methylpentamethylenediamine, hexamethylenediamine, 2,2,4(2,4,4)-trimethylhexamethylenediamine, isophoronediamine (IPD), 1,2-diaminocyclohexane and 1,3-bis (aminomethyl)benzene. Suitable carbonyl compounds to be employed for the preparation of the Schiff base are in principle all (cyclo)aliphatic aldehydes and ketones; however, preference is given to the use of isobutyraldehyde, 2-ethylhexanal, methyl ethyl ketone, methyl isobutyl ketone, diisobutyl ketone, cyclohexanone and 3,5,5-trimethylcyclohexanone. A particularly advantageous variant of the process according to the invention consists in employing disecondary diamines as are obtained by reaction of diprimary diamines with acrylates, for example methyl, ethyl, butyl or 2-ethylhexyl acrylate. The reaction of the diamine with the acrylate takes place at 60°–80° C. in a molar ratio of 1:2.

The present invention additionally provides the polyaddition products containing isocyanate groups and uretdione groups which have been prepared as claimed from isophorone diisocyanate which contains isocyanurate groups and uretdione groups and has been prepared using tertiary phosphines, and from diols and/or linear hydroxyl-containing polyesters having a molar mass of 250–2,000, preferably 300–1,500, and, if desired, monoalcohols and/or monoalmines.

The polyaddition products according to the invention, namely
1. adducts having terminal free NCO groups;
2. those whose NCO groups are reacted wholly or partially with monoalcohols or monoamines; and
3. those with terminal OH groups are generally compounds with a molecular weight (Mn) in the range 1,500–10,000, preferably 3,000–7,000. The polyaddition products have a melting point of 80°–160° C., preferably 90°–130° C.

The compounds according to the invention are particularly suitable as hardeners for (thermoplastic) compounds of relatively high functionality having Zerewitinoff active hydrogen atoms. In combination with such compounds having Zerewitinoff active hydrogen atoms, the polyaddition products form systems which can be cured above 160° C., preferably 180° C., to form high-grade plastics. The most important area of application for such systems is that of PU powder coatings.

Having generally described this invention, a further understanding can be obtained by reference to certain specific examples which are provided herein for purposes of illustration only and are not intended to be limiting unless otherwise specified.

EXPERIMENTAL SECTION

I. Preparation of the Isophorone Diisocyanate Containing Isocyanurate Groups and Uretdione Groups (IPDI-UD/T)

1,000 parts by weight of IPDI are left to react with 10 parts by weight of tributylphosphine at room temperature for about 40 h. When the reaction mixture has an NCO content of about 32%, the unreacted IPDI is separated off together with the catalyst in a thin-film evaporator at 140° C./0.1 mbar.

The residue, the isophorone diisocyanate containing isocyanurate groups and uretdione groups, contains 1% by weight of IPDI and has an NCO content of 17.4%. After heating at 180° C. for 1 h the NCO content is 32.8%. The tributylphosphine content is 0.07%.

II. General Preparation Procedure for the Hydroxyl-Containing Linear Polyesters The starting components are placed in a reactor and are heated to about 140° C. with the aid of an oil bath. After the substances have predominantly melted, 0.1% by weight of di-n-butyltin oxide is added as catalyst. Initial elimination of $H_2O$ occurs at about 150° C. The temperature is raised to about 190° C. over the course of 2–3 h and the esterification is brought to an end over the course of about 10 h. Throughout the reaction period the mixture is stirred and a gentle stream of nitrogen is passed through the reaction mixture. The acid number of the polyesters was in each case <2 mg of KOH/g.

1. 1 mol of adipic acid and 2 mol of neopentyl glycol (NPG) were reacted in accordance with the general preparation procedure. The reaction product had the following characteristics:

OH number [mg of KOH/g]: 340±10
viscosity [mPa.s] at 25° C.: 1,600±200

2. 1.25 mol of adipic acid and 2.25 mol of NPG were reacted in accordance with the general preparation procedure. The reaction product had the following characteristics:

OH number [mg of KOH/g]: 290±15
viscosity [mPa.s] at 25° C.: 2,000±200

3. 4 mol of adipic acid, 3 mol of NPG and 2 mol of hexanediol were reacted in accordance with the general preparation procedure. The reaction product had the following characteristics:

OH number [mg of KOH/g]: 105±10
viscosity [mPa.s] at 25° C.: 3,400±300

III. Disecondary Diamines

The diamines (1–3) employed in the process according to the invention were prepared in a known manner by reacting the diamine with the carbonyl compound (in Example 3.: vice versa) followed by hydrogenation.

1. N,N'-diisobutylisophoronediamine
2. 1,1,6,6-tetraisopropyl-2,5-diazahexane
3. N,N'-di-tert-butylethylenediamine
4. The diamine in this example (4) was prepared by reacting 1 mol of isophorone diamine and 2 mol of t-butyl acrylate. Its amine equivalent weight was 214.

IV. General Preparation Procedure for the Polyaddition Compounds According to the Invention Containing Isocyanurate Groups and Uretdione Groups 1. IPDI-UD/T and diols/OH-containing linear poly-ester The polyol component and the IPDI-UD/T are dissolved in acetone to give a solution with a strength of about 50%. 0.02% by weight of dibutyltin dilaurate is added with vigorous stirring under an inert gas atmosphere and the mixture is heated at boiling until 1 NCO equivalent has reacted per mole of OH groups. This takes about 3–4 h.

If the free NCO groups are also to be blocked with monoalcohols, the monoalcohol is added at this point and heating is continued until 1 NCO equivalent has reacted per mole of monoalcohol. Following reaction, the acetone is distilled off. A vacuum is applied in order to remove the last traces of acetone.

2. IPDI-UD/T and disecondary diamines

The IPDI-UD/T is dissolved in acetone. The disecondary diamine is added at room temperature with intense stirring at a rate such that the temperature does not rise above 40° C. After the diamine has been added the reaction is over; the acetone is then separated off as described under IV.1.

If the free NCO groups of the reaction product are also to be blocked wholly or partially with a monoalcohol, then before separating off the acetone the monoalcohol is added to the acetone solution together with 0.02% of DBTL and the mixture is heated at 60° C. until 1 NCO equivalent has reacted per mole of monoalcohol. The acetone is then separated off as under IV.1.

| | Composition in mol | | | | | Chemical and physical characteristics | | | |
|---|---|---|---|---|---|---|---|---|---|
| Example | | | OH-containing | Disecondary | | NCO content (% by weight) | | Melting range | Glass transition |
| No. | IPDI-UD/T | Diol | polyester | diamine | R—OH/$R_2$NH | free | total | °C. | temperature [°C.] |
| 1 | 3 | 2 B | — | — | — | 4.7 | 18.5 | 108–115 | 75–91/82 |
| 2 | 4 | 3 B | — | — | — | 3.4 | 17.0 | 111–117 | 77–93/85 |
| 3 | 5 | 4 B | — | — | — | 2.6 | 16.1 | 115–122 | 82–97/91 |
| 4 | 10 | 9 B | — | — | — | 1.1 | 14.3 | 126–140 | 88–105/94 |
| 5 | 10 | 11 B | — | — | — | 0.1 | 11.0 | 108–116 | 80–95/90 |
| 6 | 15 | 14 B | — | — | 2$C_8H_{17}$OH | 0.3 | 12.3 | 130–142 | 101–115/107 |
| 7 | 15 | 14 CHDM | — | — | 2HN($C_4H_2$)$_2$ | 0.1 | 11.2 | 164–170 | 112–125/118 |
| 8 | 15 | 13 B | 10.1 | — | — | 0.5 | 12.4 | 125–136 | 89–106/95 |
| 9 | 15 | 12 B | 20.2 | — | — | 0.4 | 11.9 | 121–132 | 85–101/91 |
| 10 | 5 | — | — | 4 IPD-A 140 | — | 1.9 | 12.5 | 146–161 | 125–142/133 |
| 11 | 10 | — | — | 9 DTB-EDA | — | 1.1 | 10.7 | 125–140 | 101–119/109 |
| 12 | 10 | — | — | 9 EDA 128 | — | 0.8 | 9.6 | 151–159 | 133–151/141 |

B: butanediol
CHDM: 1,4-bis(hydroxymethyl)cyclohexane
IPD-A 140: N,N'-diisobutylisophoronediamine
DTB-EDA: N,N'-di-tert-butylethylenediamine
EDA 128: 1,1,6,6-tetraisopropyl-2,5-diazahexane Obviously, numerous modifications and variations of the present invention are possible in light of the above teachings. It is therefore to be understood that within the scope of the appended claims, the invention may be practiced otherwise than as specifically described herein.

This application is based on German patent application DE 19 60 6030.3 filed in the German Patent Office on Feb. 19, 1996, the entire contents of which are hereby incorporated by reference.

What is claimed as new and is desired to be secured by Letters Patent of the United States is:

1. An isocyanurate- and uretdione-group-containing polyaddition product comprising the reaction product of:
  i) an isophorone diisocyanate which contains isocyanurate groups and uretdione groups; and
  ii) a component selected from the group consisting of a diol, a disecondary diamine, a linear hydroxyl-containing polyester and a mixture thereof,
  wherein said isophorone diisocyanate comprises not more than 2% by weight of free isophorone diisocyanate and $\geq 5$ wt. % of isophorone diisocyanate isocyanurate,
  wherein said isophorone diisocyanate is reacted with said diol component ii) in an NCO/OH ratio of 1:0.5–1:0.95 and/or an NCO/NH ratio of 0.5:1 0.95:1.

2. The polyaddition product of claim 1, wherein said isophorone diisocyanate comprises $\geq 10$ wt. % of isophorone diisocyanate isocyanurate.

3. The polyaddition product of claim 1, wherein said isophorone diisocyanante has been prepared by reacting isophorone diisocyanate with trialkylphosphines.

4. The polyaddition product of claim 1, wherein said diol component is selected from the group consisting of ethylene glycol, butanediol, 1,5-pentanediol, hexanediol, decanediol, dodecanediol, 3-methylpentane-1,5-diol, 2,2,4-(2,4,4)-trimethylhexanediol, neopentylglycol hydroxypivalate and a mixture thereof.

5. The polyaddition product of claim 1, wherein said diol component is a linear hydroxyl-containing polyester with a molar mass of between 250 and 2,000.

6. The polyaddition product of claim 1, wherein said diol component is a linear hydroxyl-containing polyester with a molar mass of between 300 and 1,500.

7. The polyaddition product of claim 5, wherein said linear hydroxyl-containing polyester is synthesized from
  a) at least one diol selected from the group consisting of ethylene glycol, butanediol, 1,5-pentanediol, 1,6-hexanediol, decanediol, dodecanediol, 3-methylpentanediol, 2,2,4(2,4,4)-trimethylhexanediol, neopentylglycol hydroxypivalate, 2-methylpropanediol, 2,2-dimethylpropanediol, diethylene glycol, trans-cyclohexane dimethanol, cis-cyclohexane dimethanol and a mixture thereof; and
  b) at least one monomer selected from the group consisting of succinic acid, adipic acid, suberic acid, azelaic acid, sebacic acid, 2,2,4(2,4,4)-trimethyladipic acid, hydroxycaproic acid, $\epsilon$-caprolactone and a mixture thereof.

8. The polyaddition product of claim 1, wherein said diol component comprises a diol and a hydroxyl-containing polyester in a ratio of from 5:95 to 90:10, based on hydroxyl number.

9. The polyaddition product of claim 1, wherein said disecondary diamine comprises a reaction product of:
  a) a diprimary diamine with a molecular weight of 60–250; and
  b) a carbonyl compound having 2–10 carbon atoms which is hydrogenated after reaction has taken place.

10. The polyaddition product of claim 1, wherein said disecondary diamine comprises a reaction products of:
  a) a diprimary diamine with a molecular weight of 60–250; and
  b) an acrylate whose alcohol component contains 1–10 carbon atoms.

11. The polyaddition product of claim 1, further comprising wholly or partially reacting said reaction product of isophorone diisocyanate and diol component with monoalcohols and/or monoamines.

12. The polyaddition product of claim 11, wherein said monoalcohol has 1–8 carbon atoms or said monoamine has 4–12 carbon atoms.

13. The polyaddition product of claim 1, wherein said isophorone diisocyanate and said diol component are reacted in a solvent at from 20° to 90° C.

14. The polyaddition product of claim 13, wherein the solvent is selected from the group consisting of an aromatic hydrocarbon, a ketone, an acetic ester and a mixture thereof.

15. The polyaddition product of claim 13, wherein said solvent is selected from the group consisting of toluene, xylene, acetone, methyl isobutyl ketone, cyclopentanone, cyclohexanone, ethyl acetate, butyl acetate and a mixture thereof.

16. The polyaddition product of claim 1, wherein said isophorone diisocyanate comprises $\geq 15$ wt. % of isophorone diisocyanate isocyanurate.

17. The polyaddition product of claim 1, wherein said isophorone diisocyanate comprises $\geq 20$ wt. % of isophorone diisocyanate isocyanurate.

18. The polyaddition product of claim 1, wherein said isophorone diisocyanate comprises $\leq 95$ wt. % of isophorone diisocyanate uretdione.

19. The polyaddition product of claim 1, wherein said isophorone diisocyanate comprises $\leq 90$ wt. % of isophorone diisocyanate uretdione.

20. A process for preparing an isocyanurate- and uretdione-group-containing polyaddition product comprising reacting:
  i) an isophorone diisocyanate which contains isocyanurate groups and uretdione groups; and
  ii) a component selected from the group consisting of a diol, a disecondary diamine, a linear hydroxyl-containing polyester and a mixture thereof,
  wherein said isophorone diisocyanate comprises not more than 2% by weight of free isophorone diisocyanate and >5 wt. % of isophorone diisocyanate isocyanurate,
  wherein said isophorone diisocyanate is reacted with said diol component in an NCO/OH ratio of 1:0.5–1:0.95 and/or an NCO/NH ratio of 0.5:1 0.95:1
  wherein said isophorone diisocyanate and said diol component are reacted in a solvent at from 20° to 90° C.

21. The polyaddition product of claim 1, wherein component ii) is a disecondary diamine.

22. The process of claim 20, wherein component ii) is a disecondary diamine.

* * * * *